Dec. 14, 1948.  B. A. SWENNES  2,456,542
AMPHIBIAN CARGO CARRIER
Filed Oct. 30, 1943  3 Sheets-Sheet 1

Inventor:
Benjamin A. Swennes
By Edward C. Fitzhugh
Atty.

Dec. 14, 1948.  B. A. SWENNES  2,456,542
AMPHIBIAN CARGO CARRIER
Filed Oct. 30, 1943  3 Sheets-Sheet 3

Inventor:
Benjamin A. Swennes
By: Edward C. Gritzbaugh
Atty.

Patented Dec. 14, 1948

2,456,542

UNITED STATES PATENT OFFICE 2,456,542

AMPHIBIAN CARGO CARRIER

Benjamin A. Swennes, Rockford, Ill., assignor, by mesne assignments, to United States of America as represented by the Secretary of the Navy Application October 30, 1943, Serial No. 508,304

30 Claims. (Cl. 115—1)

My invention relates to motor driven vehicles and more particularly to amphibian cargo carriers of the type propelled over land and through the water by means of movable tracks on the exterior of the carrier.

Amphibian cargo carriers having propelling tracks on the exterior have heretofore been used. These carriers were each powered by a single engine positioned centrally with respect to the sides of the vehicle and in the rear of the vehicle, and the tracks were driven by sprockets at the front of the vehicle operatively connected with the engine by means of a centrally disposed power shaft extending from the rear to the front of the vehicle. The vehicle provided a cargo carrying surface and a space for cargo between the sides of the vehicle and in front of the motor extending toward the front end of the vehicle, and the power shaft extended through a tunnel forming portion extending upwardly from the cargo carrying surface. A tracked vehicle of this type, when more heavily loaded on one side than the other, tends to veer to the more heavily loaded side, and, as is apparent, the vehicle with such an unbalanced loading is quite difficult to steer. The presence of this tunnel rendered it quite difficult to load the vehicle evenly, since a single piece of cargo could necessarily be placed only on one side or the other of the tunnel.

It is an object of my invention to provide an improved tracked amphibian cargo carrier which provides a substantially flat cargo carrying surface and a substantially unobstructed cargo space extending from one side of the vehicle to the other, whereby the vehicle may carry a single piece of cargo without disturbing the steering qualities of the vehicle. To this end, it is an object of my invention to provide a vehicle of this type having two driving engines which are disposed adjacent opposite sides of the vehicle and are connected with the propelling tracks of the vehicle by means of a pair of drive shafts extending substantially parallel and adjacent opposite sides of the vehicle. It is contemplated that such a flat cargo surface and unobstructed cargo space may be provided between the engines and drive shafts whereby the cargo may be distributed in the vehicle as desired without regard to any obstruction in the cargo space.

In the prior amphibian cargo carriers described above having a driving motor disposed adjacent the rear of the vehicle and centrally with respect to the sides of the vehicle, cargo was loaded and unloaded by lifting it over the sides of the vehicle as by means of derricks or winches. It is another object of my invention to provide an improved amphibian cargo carrier which may be loaded and unloaded without transporting the cargo over the sides of the vehicle, and to this end, it is an object to provide a gate hingedly mounted on an end of the vehicle for providing access to the cargo space in the vehicle between the motors. It is also an object to pivotally mount this gate substantially on a horizontal axis whereby the gate may serve as a ramp to facilitate moving the cargo in and out of the vehicle, and it is also an object to make this gate water-tight with respect to the rest of the vehicle when the gate is closed.

Prior amphibian vehicles have been provided with transmissions operatively disposed between the driving motor and the propelling tracks of the vehicle, and these transmissions were shifted manually by the operator according to the power and speed which he wished the propelling tracks to have. It was found quite difficult, however, for the operator to properly shift the transmission when the vehicle after running through open water suddenly grounded. In such cases, if great care were not take, the motor of the vehicle very likely stalled due to the increased resistance to movement of the tracks. It is thus another object of my invention to provide, in an amphibian tracked vehicle, a transmission which is easily shifted when the resistance to movement of the propelling tracks suddenly changes, and to this end, it is an object to provide in such a vehicle a transmission which is shifted under the control of the accelerator for the driving engine of the vehicle. It is also an object to provide such a transmission in an amphibian vehicle which shifts automatically in response to the changes of speed of the tracks on the vehicle, and more particularly it is an object to provide such a transmission which is shiftable both in response to movement of the accelerator for the driving engine of the vehicle and also in response to changes of speed of the propelling tracks.

Amphibian vehicles, particularly when they are being driven over land having an uneven surface, are subject to distortion. The driving trains of the vehicles, under such distortion, are subject to breakage if yielding means are not provided in the power trains. It is accordingly an object of my invention to provide an improved power train in a vehicle of this type having a plurality of properly placed universal joints for preventing wracking and distortion of parts of the driving train of the vehicle when the vehicle as a whole is distorted.

In a vehicle having two driving engines, it may sometimes happen that one of the engines becomes inoperative through some accident, and it is therefore an object to provide a power train in the vehicle whereby one of the engines alone may drive the vehicle and whereby one of the engines in operation may be utilized for driving the other engine to start the latter engine.

In an amphibian vehicle having two driving engines, a pair of bilge pumps is preferably provided each driven by one of the engines. It is a further object of my invention to provide a power train in such a vehicle whereby both of the bilge pumps may be driven by a single engine of the vehicle when the other engine is inoperative due to any reason.

The invention consists of the novel constructions, arrangements and devices to be hereinafter described and claimed for carrying out the above stated objects and such other objects as will appear from the following description of a certain preferred embodiment illustrated in the accompanying drawings, wherein:

Like characters of reference designate like parts in the several views.

Figure 1:
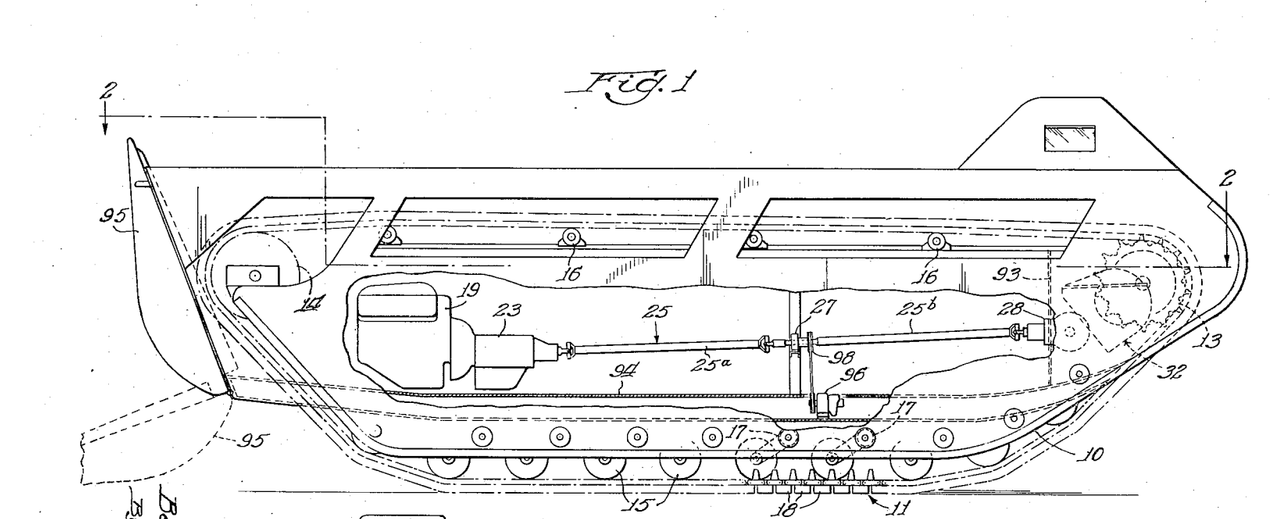
Fig. 1 is a side elevational view of an amphibian cargo carrier embodying the principles of the invention, certain portions of the carrier being broken away for the illustration of certain internal parts of the carrier.
Figure 2:
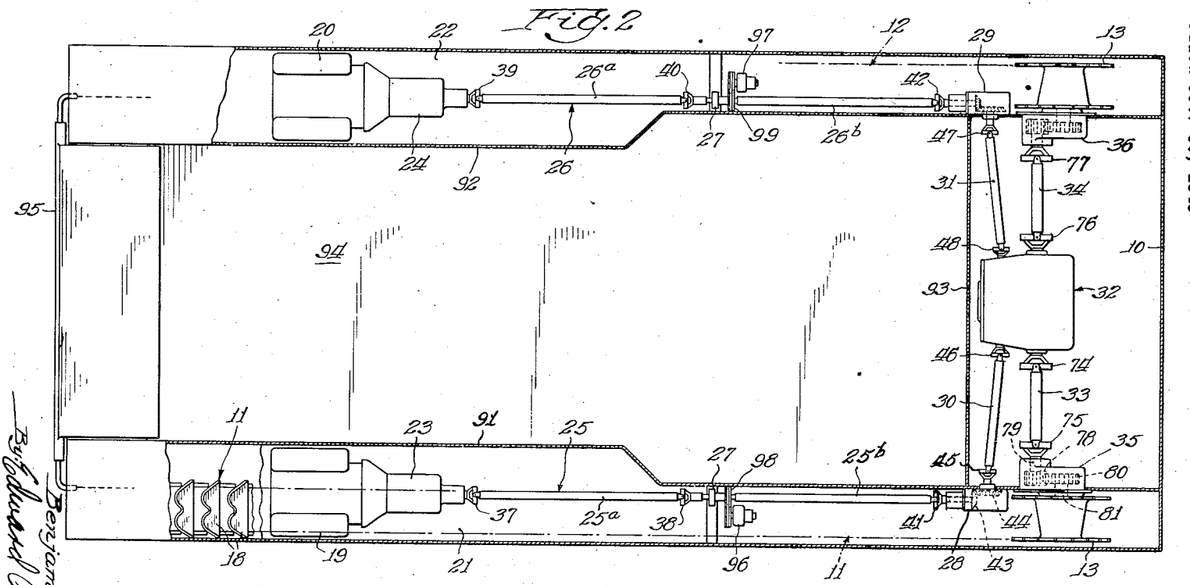
Fig. 2 is a sectional view taken on line 2—2 of Fig. 1.

The illustrated amphibian cargo carrier comprises a hull 10 on opposite sides of which are disposed movable tracks 11 and 12. The hull 10 is substantially water-tight so that the vehicle may function as a boat, and the hull is of such a rigid construction that the vehicle may function similarly to a military tank to run over uneven ground without being permanently distorted out of shape. The tracks 11 and 12 are disposed on the vehicle in the form of loops and are held in such configurations by driving sprockets 13, idlers 14, bogie wheels 15 and rollers 16. The driving sprockets 13 are adjacent the bow of the vehicle and are each driven by motors in the vehicle as will be hereinafter described, and the idlers 14 are on the stern of the vehicle and are preferably adjustable by any suitable means (not shown) to take up any slack in the tracks 11 and 12 as may be desired. The rollers 16 are on fixed axes with respect to the vehicle, and the bogie wheels 15 on the bottom of the vehicle are yieldably fixed with respect to the vehicle by suitable spring mountings 17 which permit the wheels 15 to move toward or away from the hull 10 when the vehicle is driven over rough ground. The spring mountings for the bogie wheels 15 may be of the construction shown in a co-pending application of C. E. Swenson, Serial No. 513,430, filed December 8, 1943, and which issued February 24, 1948, Patent No. 2,436,381. The tracks 11 and 12 are of the articulated type and have lugs 18 fixed thereto. The lugs 18 function when the vehicle is in the water and the tracks are driven by the sprockets 13 to propel the vehicle through the water, and the lugs 18 function, when the vehicle is on land, to provide a firm grip with the ground for propelling the vehicle over land.

A pair of motors 19 and 20 is provided in the vehicle for driving the tracks 11 and 12. The motors are disposed in sponsons 21 and 22 in the sides of the vehicle, and these sponsons are surrounded by the tracks 11 and 12 respectively, as may be seen from an inspection of the drawings. The motors 19 and 20 have mounted thereon transmissions 23 and 24, respectively, and these transmissions are connected with driven shafts 25 and 26, respectively. The shafts 25 and 26 are rotatably disposed in bearings 27 fixed with respect to the hull 10, and the shafts are connected with right angle drive units 28 and 29, respectively. The right angle drive units 28 and 29 are connected by means of shafts 30 and 31, respectively, with a combined two-speed transfer unit and controlled differential transmission 32 which will be hereinafter described in greater detail. The transmission 32 is connected by means of shafts 33 and 34 with final gear drive units 35 and 36, respectively, which function to drive the sprocket wheels 13 on opposite sides of the vehicle. Inasmuch as the motors 19 and 20 and the transmissions 23 and 24 associated therewith are on opposite sides of the vehicle, the motors and transmissions balance each other. The motors and transmissions furthermore are located quite adjacent the stern of the vehicle while the transmission 32 along with the final gear drives 35 and 36 is located adjacent the bow of the vehicle, and the bow and stern of the vehicle are also substantially balanced whereby the center of gravity of the vehicle is substantially at the center of the vehicle.

The motors 19 and 20 are of any suitable internal combustion type. The transmissions 23 and 24 are of any suitable type and preferably provide three or four different speed ratios in forward drive, a neutral condition, and at least a single ratio in reverse drive. The power shafts 25 and 26 each consists of a plurality of shaft sections; the shaft 25 consists of the sections 25a and 25b, and the shaft 26 consists of the shaft sections 26a and 26b. The shaft section 25a is provided with universal joints 37 and 38 connecting the shaft section with the transmission 23 and the shaft section 25b, respectively. The shaft section 26a is provided with similar universal joints 39 and 40 connecting the shaft section with the transmission 24 and the shaft section 26b. The shaft sections 25b and 26b are provided with universal joints 41 and 42, respectively, which connect the shaft sections with the right angle drives 28 and 29, respectively. The transmissions 23 and 24 and the driven shafts 25 and 26 function to transmit drives from the motors 19 and 20 to the right angle drives 28 and 29, and the universal joints in the two driven shafts function to allow movement of the various parts of each shaft with respect to each other, as is apparent.

The right angle drive 28 comprises a bevel gear 43 which is in mesh with a somewhat larger bevel gear 44. The bevel gear 43 is driven by the power shaft 25 and universal joint 41, as is apparent from the drawings. The right angle gear drive 29 is similar to the right angle drive 28. The shaft 30 is provided with a pair of universal joints 45 and 46 on its ends, and the shaft 31 is provided with a pair of universal joints 47 and 48 on its ends. The gear 44 in the right angle drive 28 is connected with the universal joint 45 to drive the shaft 30, and the right angle drive 29 functions similarly to drive the shaft 31. The shafts 30 and 31 and the universal joints on the ends of the shafts function to transmit a drive from the right angle gear units to the transmission mechanism 32, and the universal joints allow relative movement between the gear drives 28 and 29 and the transmission unit 32 with distortion of the hull 10 and thereby prevent wracking and distortion of the shafts 30 and 31.

Figure 3:
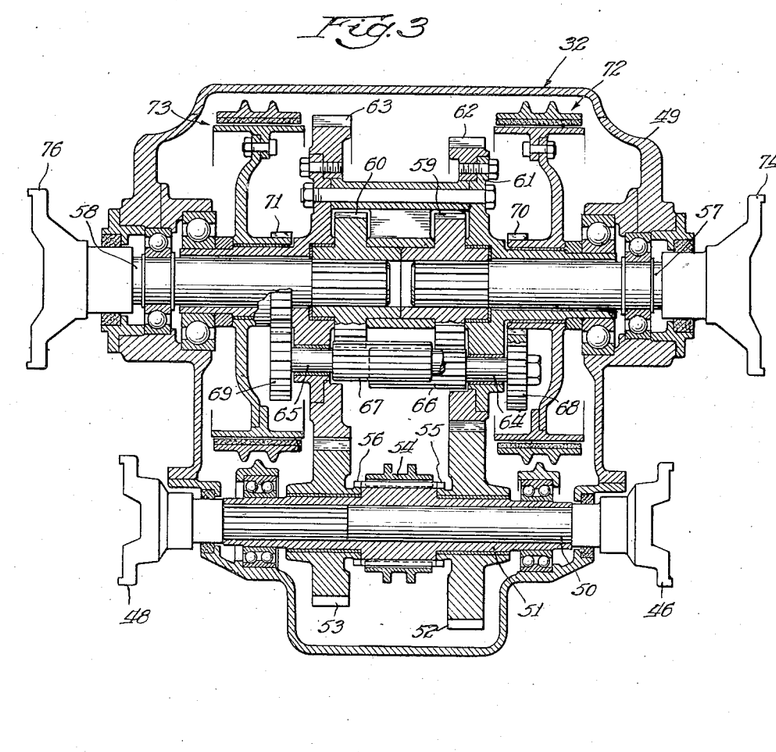
Fig. 3 is a sectional view of the controlled differential transmission located in the front of the cargo carrier.

The transmission unit 32 comprises a casing 49 in which is journalled a shaft 50 and a sleeve-like member 51 splined to the shaft 50. The shaft 50 is connected with the universal joints 46 and 48 and thereby with the shafts 30 and 31. A pair of gears 52 and 53 are rotatably disposed on the sleeve 51. A clutch sleeve 54 is splined on the sleeve 51 to be slidably and non-rotatably disposed thereon, and the gears 52 and 53 are provided with clutch teeth 55 and 56 respectively, which are adapted to mesh with the splines in the clutch sleeve 54, when the latter is moved in one direction or the other. Either of the gears 52 and 53 may be thus positively coupled with the sleeve 51 and thereby with the shaft 50.

A pair of shafts 57 and 58 is journalled in the casing 49. The shafts 57 and 58 have splined on their ends gears 59 and 60, respectively. A gear carrier element 61 is journalled in the casing 49, and the element 61 extends about and provides journals for the gears 59 and 60, as shown. The element 61 carries and has fixed thereto a ring gear 62 which is in mesh with the gear 52, and the element 61 carries and has fixed thereto a gear 63 which is in mesh with the gear 53. A pair of shafts 64 and 65 is carried by and journalled in the carrier element 61. Elongated planet gears 66 and 67 are fixed on the shafts 64 and 65 respectively, and the shafts and gears are so arranged that the gears 66 and 67 mesh with gears 59 and 60, respectively, and also with each other. Gears 68 and 69 are fixed respectively to the shafts 64 and 65 on outer ends thereof. The gear 68 is in mesh with a gear 70 journalled on the carrier element 61, and the gear 69 is in mesh with a gear 71 also journalled on the carrier element 61. The gear 70 is connected with a brake 72, and the gear 71 is connected with a brake 73, as shown, whereby the gears 70 and 71 may be arrested in rotation. Any suitable actuating means (not shown) for the brakes 72 and 73 may be provided.

The gear carrier element 61 may be driven at either of two different speed ratios from the shaft 50. When the clutch sleeve 54 is in its neutral position out of engagement with either the teeth 55 or 56, in which position it is shown in Fig. 3, no power is of course transmitted from the shaft 50 to the carrier element 61. If the clutch sleeve 54 is moved to interengage with the teeth 56, the carrier element 61 is driven at a certain speed through the gears 53 and 63, and if the clutch element 54 is moved in the opposite direction to interengage with the teeth 55, then the gear carrier element 61 is driven at a higher speed, as is apparent, through the gears 52 and 62. If both the brakes 72 and 73 are disengaged, the shafts 57 and 58 are driven at the same speed as the gear carrier element 61, when the latter is rotated, the power being transmitted through the shafts 64 and 65 and the gears 66 and 67 to the gears 59 and 60 with no rotation of the gears 66 and 67 with respect to each other or the gears 59 and 60. If, however, the brake 72 is engaged to hold the gear 70 stationary, the gear 68 and thereby the shaft 64 and gear 66 are rotated due to the rotation of the carrier element 61. Due to the relative diameters of the gears 70, 68, 66 and 67, the gear 59 and thereby the shaft 57 are rotated at a less speed than the carrier element 61, while the gear 60 and the shaft 58 are rotated at an increased speed. Similarly, if the brake 73 is engaged while the brake 72 is disengaged, then the shaft 57 is rotated at a greater speed while the shaft 58 is rotated at a lesser speed than the speed of the gear carrier element 61. It will thus be apparent that the gears 52 and 53 and the clutch element 54 may be utilized for driving the shafts 57 and 58 at two different speed ratios and that the brakes 72 and 73 may be utilized for rotating either of the shafts 57 and 58 at a greater speed than the other of the shafts.

The shaft 33 is provided with universal joints 74 and 75 on its ends, and the shaft 34 is provided with universal joints 76 and 77 on its ends. These joints function, as is apparent, to permit relative movement between the transmission 32 and the final gear drives 35 and 36 due to distortion of the hull 10. The final gear drive 35 comprises a spur gear 78 fixed to a shaft 79 which is driven by the universal joint 75. The gear 78 is in mesh with a gear 80 which is fixed to a shaft 81. The shaft 81 has fixed thereon the sprocket 13 on the side of the vehicle on which the final gear drive 35 is disposed, and the sprocket is thus driven through the gears 78 and 80 when the shaft 33 rotates. The construction of the final gear drive 36 on the other side of the vehicle is similar to that of the gear drive 35, and the sprocket 13 on the same side of the vehicle as the gear drive 36 is similarly driven by this gear drive.

Figure 4:
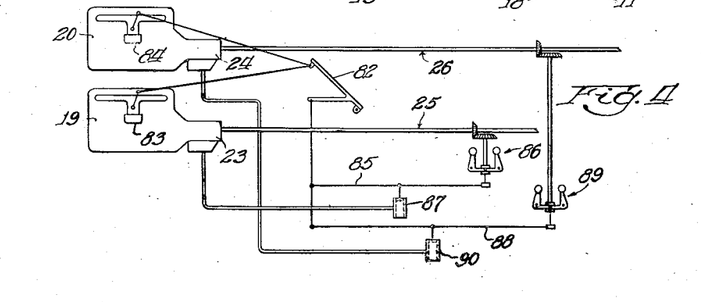
Fig. 4 is a diagrammatic illustration of a control arrangement which may be used with the transmissions connected directly behind each of the motors of the vehicle for automatically controlling the transmissions.

The engines 19 and 20 are preferably under the control of a single accelerator 82, as may be seen in Fig. 4 which shows diagrammatically the interconnection between the accelerator and the carburetors 83 and 84 of the engines. Each of the transmissions 23 and 24 preferably is of such a construction and has such a control arrangement associated therewith as to be under the joint control of the accelerator 82 and of a device responsive to the speed of the respective driven shaft of the transmission. It is contemplated that the control arrangement for each of the transmissions shall be such that the transmission may be downshifted to drive the respective driven shaft at a lower speed ratio but with greater power either under the control of the accelerator 82 by moving the accelerator toward the fully open throttle position of the carburetors 83 and 84 from a less open throttle position or due to a decrease in speed of the respective driven shaft of the transmission. It is further contemplated that the control arrangement for each of the transmissions shall be such that the transmission shall be upshifted to drive the respective driven shaft at a higher speed ratio by a movement of the accelerator 82 in the opposite direction or by an increasing speed of the respective driven shaft of the transmission. Such a transmission control arrangement is shown by way of example in Fig. 4.

Referring to Fig. 4, the illustrated control arrangement for the transmissions 23 and 24 includes a movable lever 85 which is linked with the accelerator 82 and which is also under the control of a governor 86 driven by the driven shaft 25 of the transmission 23. The lever 85 is linked at an intermediate point thereon with a transmission control 87, which may be a valve or any other suitable device connected with the transmission 23 for changing the speed ratio in the transmission. It is contemplated that the device 87 on an upward movement as seen in the figure causes an upshift in speed ratio in the transmission and conversely causes a downshift in speed ratio on a downward movement thereof. When the accelerator 82 is moved in a counterclockwise direction as seen in the figure toward a more fully opened throttle position, the link 85 moves downwardly as seen in the figure with the accelerator and moves the control device 87 also in such direction to cause a downshift of the transmission. When the speed of the driven shaft 25 decreases from any value, the governor 86 driven thereby functions similarly to move the lever 85 and thereby the control device 87 downwardly as seen in the figure to also cause a downshift. It will be apparent that an opposite movement of the accelerator 82 or an increase in speed of the driven shaft 25 will, conversely, cause the upshift in speed ratio in the transmission 23. A similar control arrangement for the transmission 24 may be provided including a lever 88 linked with the accelerator 82 and also acted on by a governor 89 driven by the driven shaft 26. A control device 90 for the transmission 24 which is similar to the control device 87 is acted on by the lever 88. It is contemplated that each of the transmissions 23 and 24 may be controlled by any suitable manual control (not shown) for conditioning the transmission to transmit power in its forward speed ratios and for shifting the transmission to neutral condition or reverse. A more detailed disclosure of control arrangements for transmissions and including certain refinements which arrangements are similar to the control arrangements for each transmission herein disclosed and may be used to control the transmissions 23 and 24, as well as a disclosure of specific transmission contructions which may be used, is given in patents to W. T. Livermore, No. 2,120,104, issued June 7, 1938, and No. 2,103,540, issued December 28, 1937, and in an application of W. T. Livermore, Serial No. 336,704, filed May 23, 1940, and which matured into Patent No. 2,399,554 on April 30, 1946.

It will be apparent from an inspection of the drawings and particularly Fig. 2 thereof, that due to the disposition of the motors 19 and 20 and driven shafts 25 and 26 in the side sponsons of the vehicle, there is provided an unobstructed space in the center of the vehicle. This space extends between the sheet metal protective coverings 91 and 92 for the motors and the driven shafts, and it extends longitudinally of the vehicle from the protective sheet metal covering 93 for the transmission 32 and shafts 30, 31, 33 and 34 adjacent the bow of the vehicle to the stern of the vehicle. The vehicle is provided with a substantially flat floor or surface 94 extending between the sheet metal coverings 91 and 92 and between the sheet metal covering 93 and the stern of the vehicle, and cargo may be placed on this surface in the space defined by these sheet metal coverings to be transported in the vehicle.

A gate 95 is hingedly mounted on the stern of the vehicle by means of a horizontally extending hinge and the gate is adapted to pivotally move downwardly, as is shown in dotted lines in Fig. 1. When the gate is in such a lowered position, it provides access at the stern of the vehicle into the cargo space between the motors 19 and 20 and the driven shafts 25 and 26, and the gate 95 when in such position is also adapted to function as a ramp on which cargo may be moved into the cargo space in the vehicle. The gate 95 may be raised and lowered by any suitable means.

Bilge pumps 96 and 97 are preferably provided in the vehicle for pumping out any water which may accumulate in the vehicle either from splashing over the sides or from leakage into the vehicle. The bilge pumps are preferably located on opposite sides of the vehicle as shown. The bilge pump 96 is driven by a pulley 98 fixed to the driven shaft 25 and a suitable belt, and the bilge pump 97 is driven by a similar pulley 99 fixed to the driven shaft 26 and belt.

Prior to operation of the vehicle, the clutch sleeve 54 is shifted to be either in mesh with the clutch teeth 56 to provide a low range of operation or to be in mesh with the clutch teeth 55 to provide a high range of operation. When the sleeve 54 has been shifted one way or the other, a depression of the accelerator 82 functions to cause a transmission of power from the motors 19 and 20 through the transmissions 23 and 24 in their lowest speed ratios and through the driven shafts 25 and 26, the right angle drives 28 and 29 and the shafts 30 and 31 to the shaft 50 of the transmission unit 32 which acts as a common driven shaft for the motors and transmissions, assuming that each of the transmissions 23 and 24 has been preliminarily conditioned for a transmission of power in the forward direction. Upon such a rotation of the shaft 50, the gear carrier 61 is rotated either by means of the gears 53 and 63 or the gears 52 and 62, depending upon which way the clutch sleeve 54 has been shifted, and the shafts 57 and 58 are driven through the gears 66 and 67 and the gears 59 and 60. Power is transmitted from the shafts 57 and 58 to the driving sprockets 13 through the shafts 33 and 34 and the final gear drives 35 and 36. Upon the sprockets 13 being so driven, the tracks 11 and 12 move over the rollers 16, the idlers 14 and the bogie wheels 15, and the vehicle is put in motion. The speeds of the tracks 11 and 12 and the speeds of the shafts 25 and 26 are of course proportional and on increases in speed of the tracks, the transmissions 23 and 24 are upshifted due to the functioning of the governors 86 and 89 driven by the shafts.

When the vehicle is traveling in the water, the transmissions 23 and 24 will generally be operating in their highest speed ratio, and when the shore is approached preparatory to driving the vehicle from the water to land, the tracks 11 and 12 suddenly ground, and due to the functioning of the governors 86 and 89 upon the accompanying sudden decrease of speed of the shafts 25 and 26, the transmissions immediately downshift to provide the extra power necessary for propelling the vehicle up the shore and on to the land. A vehicle operator furthermore may be expected more or less unconsciously to cause the transmissions 23 and 24 to downshift when the tracks 11 and 12 suddenly ground by a depressing of the accelerator 82 to further open the carburetors 83 and 84 due to his desire to provide additional power for driving the tracks 11 and 12. When the vehicle is driven from the land into water, the transmissions 23 and 24 under the control of the governors 86 and 89 automatically upshift to increase the speed of the tracks 11 and 12 after the tracks cease to contact ground. Due to the provision of the transmissions 23 and 24 under the control of the accelerator and governors the transmissions are kept in their proper speed ratios, and the motors are not stalled when ground is suddenly contacted by the tracks in landing the vehicle.

When it is desired to steer the vehicle in either direction, when the vehicle is traveling either over land or through the water, it is simply necessary to apply one or the other of the brakes 72 and 73. Such application of one of the brakes as has been hereinbefore described, causes an increase in speed of one of the shafts 57 and 58 and a decrease in speed of the other shaft. The shafts 57 and 58 drive the tracks on opposite sides of the vehicle, and the speeds of the tracks are correspondingly increased and decreased with the speeds of the shafts whereby the vehicle turns in one direction or the other.

One of the motors 19 and 20 may be started from the other motor if desired. This is possible due to the connection through the transmissions 23 and 24 and driven shafts 25 and 26 with the common shaft 50. When it is desired to so start one motor, the clutch sleeve 54 is put into its neutral position, substantially as shown in Fig. 3, and both of the transmissions 23 and 24 are put into power transmitting condition, and one of the motors may then function to drive the other through the transmissions 23 and 24, and the shafts 25, 26, 30, 31 and 50. Due also to this connection of each of the motors with the shaft 50, either of the bilge pumps 96 and 97 may be driven from a single one of the motors, as for example when one of the motors is in inoperative condition. The power train from one of the motors is through one of the shafts 25 and 26, through the shafts 30, 31 and 50 to the other one of the shafts 25 and 26. The inoperative motor is preferably disconnected due to its associated transmission 23 or 24 being in neutral condition when both bilge pumps are so driven, and the clutch sleeve 54 may also be in neutral position. It will be apparent also that the vehicle may be driven by only one motor, as when the other is disabled, and in this case also the inoperative motor is preferably disconnected from its driven shaft by having the associated transmission 23 or 24 in neutral condition. The power train in this case is from the operative motor through its transmission and driven shaft, one of the right angle drives, and one of the shafts 30 and 31 to the transmission 32, and from thence to the tracks.

It is apparent that the provision of two motors located on opposite sides of the vehicle, rather than a single motor centrally located of the vehicle, provides an unobstructed cargo carrying surface and cargo space between the motors and extending substantially from the controlled differential transmission to the stern of the vehicle. The gate 95 acting as a ramp permits cargo to be easily moved into the cargo space of the vehicle without lifting the cargo over the sides of the vehicle. The cargo may be dragged up the ramp or it may be driven over the ramp into the vehicle if it is self-powered, and the cargo may be similarly removed from the vehicle. Cargo may be particularly easily removed from the vehicle simply by fixing the cargo with respect to some stationary object outside of the vehicle and then driving the vehicle away from the fixed object and thus pulling the cargo out of the vehicle.

Due to the provision of the numerous universal joints in the drive shafting of the vehicle, wracking and permanent distortion of any part of the driving mechanism of the vehicle does not occur due to distortion of the hull 10 as a whole when the vehicle is driven over rough ground.

It will be apparent to those skilled in the art that changes may be made to the construction and arrangements shown and described without departing from the principles of the invention. In particular, it will be understood that the transmissions 23 and 24 and the arrangements for controlling the transmissions may be other than those shown in Fig. 4 or in the Livermore patents and application hereinbefore referred to. I wish it therefore to be understood that my invention is not to be limited to the specific constructions and arrangements shown and described except only insofar as the claims may be so limited.

I claim:

1. In an amphibian vehicle, the combination of movable tracks on the exterior of the vehicle adapted to propel the vehicle either over land or through the water, a motor in said vehicle and connected to drive said tracks, an accelerator for said motor, a transmission providing a plurality of speed ratios and operatively connected between said motor and said tracks, and governor means responsive to the speed of said tracks, said transmission being under the joint control of said accelerator and said governor means to down-shift the transmission when said accelerator is moved toward fully open throttle position or when the speed of said tracks decreases and to upshift the transmission when said accelerator is moved toward fully closed position or the speed of said tracks increases, whereby when the vehicle is driven from land to water or vice versa a proper change in speed ratio is provided.

2. In an amphibian vehicle, the combination of movable tracks on the exterior of the vehicle adapted to propel the vehicle either over land or through the water, a pair of motors in said vehicle connected in parallel to a common shaft and connected thereby to drive said tracks, and a transmission providing a plurality of speed ratios and operatively connected between each of said motors and said common shaft, means responsive to the speed of the common shaft, said transmissions being shiftable between the speed ratios thereof automatically under the control of the means responsive to the speed of the common shaft, whereby when the vehicle is driven from water to land or vice versa the transmissions automatically provide the proper changes in speed ratio.

3. In an amphibian vehicle, the combination of movable tracks on the exterior of the vehicle adapted to propel the vehicle either over land or through the water, a pair of motors in said vehicle and connected in parallel to a common shaft and connected thereby to drive said tracks, an accelerator for controlling the speed of said motors, governor means responsive to the speed of said common shaft, and a transmission providing a plurality of speed ratios operatively connected between each of said motors and said common shaft, said transmissions being shiftable between speed ratios under the joint control of said accelerator and said governor means such that the transmissions are downshifted when the accelerator is moved toward fully open throttle position or the speed of said common shaft decreases.

4. In an amphibian vehicle, the combination of a pair of tracks on the exterior of the vehicle on opposite sides thereof and adapted to propel the vehicle either over land or through the water, a pair of motors in said vehicle on opposite sides of the vehicle and connected in parallel with a common shaft and connected thereby to drive said tracks, an accelerator for controlling the speed of both said motors, governor means responsive to the speed of said common shaft, and a transmission providing a plurality of speed ratios and operatively connected between each of said motors and said common shaft, said transmissions being shiftable between speed ratios under the joint control of said accelerator and said governor means, whereby the transmissions are downshifted when the accelerator is moved toward open throttle position or the speed of the common shaft decreases and whereby the transmissions are upshifted when the accelerator is moved toward closed throttle position or the speed of the common shaft increases.

5. In a freight carrying vehicle, the combination of means on the exterior of the vehicle for propelling the vehicle, a pair of motors in the vehicle spaced from each other and disposed adjacent opposite sides of the vehicle, means located at one end of said vehicle and operatively connecting said motors with said vehicle propelling means, and means providing a substantially flat unobstructed freight carrying surface in the vehicle extending substantially from one of said motors to the other, whereby freight may be carried thereby between the motors of the vehicle, and extending from said connecting means at one end of the boat to the other end of the boat whereby freight may be loaded and unloaded on the last mentioned end of the boat substantially at the level of said surface.

6. In a freight carrying vehicle, the combination of means on the exterior of the vehicle for propelling the vehicle, a pair of motors in the vehicle spaced from each other and disposed adjacent opposite sides of the vehicle, and means for operatively connecting said motors with said vehicle propelling means and including motor driven shafts spaced and extending substantially parallel to each other adjacent the sides of the vehicle and other driven mechanism located at one end of the vehicle and connecting said shafts and said propelling means, and means providing a substantially flat unobstructed freight-carrying surface in the vehicle extending substantially from the motor and shaft on one side to the motor and shaft on the other side and from said driven mechanism at one end of the vehicle to the other end of the vehicle whereby freight may be loaded and unloaded on the last-mentioned end of the vehicle at substantially the level of said surface and the freight may be carried between said motors and shafts.

7. In a freight carrying vehicle, the combination of means providing a pair of sponsons on opposite sides of the vehicle, a pair of tracks movably disposed about said sponsons, a pair of motors in the vehicle, said motors being spaced and each being disposed at least partially in one of said sponsons, means operatively connecting said motors to said tracks and located at one end of said vehicle, and means providing a freight carrying surface in the vehicle extending between said motors and from said connecting means at one end of the vehicle to the other end of the vehicle whereby freight may be loaded and unloaded on the last-mentioned end of the vehicle at substantially the level of said surface.

8. In a freight carrying vehicle, the combination of means providing a pair of hollow sidewardly extending body portions or sponsons on opposite sides of the vehicle, a pair of tracks movably disposed about said sponsons for propelling the vehicle, a sprocket for driving each of said tracks and disposed adjacent one end of the vehicle, a pair of motors in the vehicle spaced from each other and each disposed at least partially in one of said sponsons, and means for connecting said motors with said sprockets and including transmission mechanism disposed adjacent the same end of the vehicle as the sprockets and a pair of drive shafts connecting said motors and transmission mechanism and extending substantially parallel to each other and adjacent the sides of the vehicle, and means providing a freight carrying surface in the vehicle so disposed and arranged that freight may be carried thereby between the motors and shafts and substantially from said transmission mechanism adjacent one end of the vehicle to the other end of the vehicle whereby freight may be loaded and unloaded with respect to said vehicle substantially at the level of said surface at said last-mentioned end of the vehicle.

9. In a boat for carrying cargo, the combination of a pair of means on opposite sides of the boat for propelling the boat, a pair of motors in the boat, said motors being spaced and disposed adjacent opposite sides of the boat whereby to balance each other, means operatively connecting said motors to said propelling means and located at one end of said boat, said motors and said connecting means defining a cargo-carrying well in said boat, and means providing a substantially flat unobstructed cargo-carrying surface in said well extending between said motors and between said connecting means at one end of the boat to the other end of the boat whereby freight may be loaded on the last-mentioned end of the boat at substantially the level of said surface.

10. In a boat for carrying cargo, the combination of a pair of tracks on opposite sides of the boat for propelling the boat, a pair of motors in the boat spaced from each other and disposed adjacent opposite sides of the boat, and means for connecting said motors with said boat propelling means and including transmission mechanism adjacent one end of the boat and motor driven shafts connected with said motors and extending substantially parallel to each other and adjacent the sides of the boat and connected with the transmission mechanism, said motors substantially balancing each other and being disposed between the center of the boat and its other end whereby the center of gravity of the boat is approximately at the center of the boat, and means providing a cargo carrying surface so disposed that cargo may be carried thereby between said motors and between said transmission mechanism adjacent one end of the boat and the other end of the boat, whereby freight may be loaded and unloaded with respect to the surface at said last mentioned end of the boat substantially at the level of said surface.

11. In a boat for carrying cargo, the combination of means providing a pair of sponsons on opposite sides of the boat, a pair of tracks movably disposed about said sponsons and adapted to propel the boat through the water, a pair of motors in the boat connected to drive said tracks, said motors being spaced and each being disposed at least partially in one of said sponsons whereby to balance each other, and means providing a substantially flat unobstructed cargo carrying surface in the boat extending substantially from one of said motors to the other whereby cargo may be carried thereby between said motors.

12. In a boat for carrying cargo, the combination of a pair of tracks on opposite sides of the boat and adapted to propel the boat through the water, a pair of motors in the boat spaced from each other and disposed adjacent opposite sides of the boat, sprockets for driving said tracks and disposed adjacent one end of the boat, and means for operatively connecting said motors with said sprockets and including transmission mechanism adjacent said end of the boat and connected to drive said sprockets, and motor driven shafts connected with said motors and extending substantially parallel to each other and adjacent the sides of the boat and connected to drive said transmission mechanism, said motors balancing each other and being so disposed adjacent the other end of the boat such that the center of gravity of the boat is approximately at the center of the boat, and means providing a cargo carrying surface so disposed that cargo may be carried thereby between said motors and substantially from said transmission mechanism adjacent one end of the boat to the other end of the boat and disposed so as to be easily accessible from the outside of the boat for the loading and unloading of cargo.

13. In a boat for carrying cargo, the combination of means providing a pair of sponsons on opposite sides of the boat, a pair of tracks movably disposed about said sponsons and adapted to propel the boat through the water, a pair of motors in the boat spaced from each other and each disposed at least partially in one of said sponsons, a sprocket for driving each of said tracks and disposed adjacent one end of the boat, means for connecting said motors with said sprockets and including transmission mechanism adjacent said end of the boat, a gear reduction set connected to drive each of said sprockets, drive shafts connecting said transmission and said gear sets, a pair of right angle gear drives on opposite sides of the boat, drive shafts connecting said transmission mechanism with said right angle drives, drive shafts connecting said motors with said right angle drives and extending substantially parallel to each other and adjacent the sides of the boat, and means providing a cargo carrying surface so disposed that cargo may be carried thereby between said motors and substantially from said transmission mechanism adjacent one end of the boat to the other end of the boat, said motors being so disposed on opposite sides of the boat and adjacent said last named end of the boat whereby the center of gravity of the boat is approximately at the center thereof.

14. In a vehicle, the combination of means on the exterior of the vehicle for propelling the vehicle, a pair of motors in the vehicle connected to drive said propelling means and being spaced from each other and disposed adjacent opposite sides of the vehicle, and transmission mechanism disposed adjacent one end of the vehicle and operatively between the motors and the propelling means, means providing a substantially flat unobstructed freight carrying surface and a space for freight in the vehicle between the sides of the vehicle and extending substantially from one of said motors to the other and from said transmission mechanism adjacent one end of the vehicle to the other end of the vehicle whereby freight may be loaded and unloaded with respect to said vehicle substantially at the level of said surface, and a gate on said last named end of the vehicle for providing a passage for loading and unloading freight on the freight carrying surface.

15. In a vehicle, the combination of a pair of tracks on the exterior of the vehicle on opposite sides thereof for propelling the vehicle, a pair of motors in the vehicle connected to drive said tracks and being spaced from each other and disposed adjacent opposite sides of the vehicle, and transmission mechanism disposed adjacent one end of the vehicle and operatively disposed between the motors and tracks, means providing a substantially flat unobstructed freight carrying surface and a space for freight in the vehicle between the sides of the vehicle and extending substantially from one of said motors to the other and from said transmission mechanism adjacent one end of the vehicle to the other end of the vehicle whereby freight may be loaded and unloaded with respect to said vehicle substantially at the level of said surface, and a gate on said last named end of the vehicle for providing a passage for loading and unloading freight on the freight carrying surface.

16. In an amphibian vehicle, the combination of a pair of movable tracks on the exterior of the vehicle on opposite sides thereof and adapted to propel the vehicle over land or through the water, a pair of motors in the vehicle spaced and disposed adjacent opposite sides of the vehicle and connected to drive said tracks, transmission mechanism disposed adjacent one end of the vehicle and operatively disposed between said motors and said tracks, means providing a substantially flat unobstructed freight carrying surface and a space for freight in the vehicle extending substantially from one of said motors to the other and extending from said transmission mechanism adjacent one end of the vehicle to the other end of the vehicle whereby freight may be loaded and unloaded with respect to said vehicle substantially at the level of said surface, and a gate on said last named end of the vehicle for providing a passage for loading and unloading freight on the vehicle and being arranged to be substantially water-tight with the rest of the vehicle when closed.

17. In an amphibian vehicle, the combination of a pair of tracks on the exterior of the vehicle on opposite sides thereof and adapted to propel the vehicle over land or through the water, a pair of motors in the vehicle spaced and disposed adjacent opposite sides of the vehicle, a sprocket for driving each of said tracks, means for operatively connecting said motors and said sprockets and including transmission mechanism disposed adjacent one end of the vehicle and operatively connected with said sprockets and a pair of driven shafts operatively connecting said motors and said transmission mechanism, said shafts being disposed substantially parallel to each other and adjacent opposite sides of the vehicle, means providing a substantially flat unobstructed cargo carrying surface and a space for cargo in the vehicle extending substantially from the motor and shaft on one side to the motor and shaft on the other and extending from said transmission mechanism adjacent one end of the vehicle to the other end of the vehicle whereby freight may be loaded and unloaded with respect to said vehicle substantially at the level of said surface, and a gate on said last named end of the vehicle and pivotally mounted with respect to the vehicle substantially at the lower edge of the gate, said gate when closed providing a water tight seal with respect to the vehicle and when open providing a ramp whereby for facilely loading and unloading freight on the vehicle.

18. In a vehicle, the combination of means on the exterior of the vehicle on each side thereof for propelling the vehicle, a motor in the vehicle, means for operatively connecting said motor and said propelling means and including a transmission mechanism substantially equally distant from the sides of the vehicle and operatively connected with said motor and to gearing associated with and driving said propelling means, a shaft for operatively connecting the gearing of said propelling means on each side of the vehicle and said transmission mechanism, and a pair of universal joints on the ends of each of said shafts, one of each pair of joints being disposed between the shaft and gearing of the propelling means and the other of each pair of joints being disposed between the shaft and transmission mechanism.

19. In a vehicle, the combination of means on the exterior of the vehicle on each side thereof for propelling the vehicle, a pair of motors in the vehicle spaced from each other and adjacent opposite sides of the vehicle, and means for operatively connecting the motors and said propelling means and including a transmission mechanism substantially equally distant from the sides of the vehicle, a shaft for operatively connecting said propelling means on each side of the vehicle and said transmission mechanism, and a shaft driven by each of the motors and connected to drive said transmission mechanism and a pair of universal joints provided on the ends of each of said shafts whereby to prevent distortion of said shafts as the vehicle is distorted when being driven.

20. In a vehicle, the combination of means on the exterior of the vehicle on each side thereof for propelling the vehicle, a pair of motors in the vehicle spaced from each other and disposed adjacent opposite sides of the vehicle, means for operatively connecting the motors and said propelling means and including a transmission mechanism substantially equally distant from the sides of the vehicle, a shaft for operatively connecting said propelling means on each side of the vehicle and said transmission mechanism, a right angle drive on each side of said vehicle, a shaft connecting each of said right angle drives and said transmission mechanism, a shaft connecting each of said motors with the right angle drive on the same side of the vehicle, and a pair of universal joints on the ends of each of said shafts whereby to avoid wracking and distortion of the shafts as the vehicle is distorted when being driven.

21. In an amphibian vehicle, the combination of means on the exterior of the vehicle for propelling the vehicle either over land or through the water, a pair of motors in the vehicle spaced and disposed on opposite sides of the vehicle, means providing a power train between each of said motors and said vehicle propelling means, said second named means including a transmission disposed substantially equally distant from the sides of the vehicle and operatively connected with said vehicle propelling means, said transmission including a common shaft connected to be driven by both of said motors, and means for selectively disconnecting either of said motors from said common shaft, either of said motors being adapted to drive and start the other motor when both of the motors are connected to said common shaft and each of the motors being adapted alone to drive said vehicle when the other motor is disconnected from the common shaft.

22. In a boat, the combination of means on the exterior of the boat for propelling the boat, a pair of motors in the boat, means providing a power train between each of said motors and said boat propelling means and including a shaft driven by each of said motors and driving a common shaft, a bilge pump driven by each of said first named shafts, and means for disconnecting each of said motors from its driven shaft, both of said bilge pumps being adapted to be driven by a single one of said motors through said first named shafts and said common shaft.

23. In a boat, the combination of means on the exterior of the boat for propelling the boat, a pair of motors in the boat, means providing a power train between each of said motors and said propelling means and including a transmission adapted to drive said propelling means and a shaft adapted to be driven by each of said motors, said transmission including a common shaft connected with each of said driven shafts to be driven thereby, means for disconnecting said common shaft from said boat propelling means, means for disconnecting each of said motors from its driven shaft, and a bilge pump connected to be driven by each of said driven shafts, both of said bilge pumps being adapted to be driven by one of said motors by means of said first named shafts and said common shaft when the other motor is disconnected from its driven shaft and said propelling means is disconnected from said transmission.

24. In an amphibian vehicle, the combination of a pair of tracks on the exterior of the vehicle on each side thereof and adapted to propel the vehicle over land or through the water, a pair of motors in the vehicle spaced and disposed adjacent opposite sides of the vehicle, and means providing a power train between each of said motors and said tracks and including a transmission connected to drive each of said tracks and a pair of shafts adapted to be driven by said motors and extending substantially parallel to each other and adjacent the sides of the vehicle, said transmission including a common shaft connected to be driven by said driven shafts, a bilge pump connected to be driven by each of said first named shafts, means for disconnecting each of said driven shafts from its respective motor, and means for disconnecting said common shaft from said tracks, each of said bilge pumps being adapted to be driven by one of said motors alone when the other motor is inoperative and said tracks are stationary when said last named motor is disconnected from its driven shaft and said common shaft is disconnected from said tracks.

25. In an amphibian vehicle, the combination of movable tracks on the exterior of the vehicle adapted to propel the vehicle either over land or through water, a pair of motors in said vehicle connected in parallel to a common shaft and connected thereby to drive said tracks, an accelerator for controlling the speed of said motors, and a transmission providing a plurality of speed ratios and operatively connected between each of said motors and said common shaft, said transmissions being shiftable between the speed ratios thereof under the control of said accelerator whereby when the vehicle is driven from water to land or vice versa the transmissions may be controlled by the vehicle operator to provide the proper change in speed ratio.

26. An amphibian comprising: a hull; two hollow members, one of which is provided on each side of said hull; two track-laying belts, one of which is mounted about each of said hollow members; a pair of engines for driving said belts, each of said hollow members having one of said engines mounted therein; means for transmitting power from said engines to said belts for driving the latter at the same or different speeds; and a door in one end of said hull for loading and unloading cargo.

27. An amphibian comprising: a hull; two hollow members, one of which is provided on each side of said hull; two track-laying belts, one of which is mounted about each of said hollow members; a pair of engines for driving said belts, each of said hollow members having one of said engines mounted therein; means located across one end of said hull for transmitting power from said engines to said belts for driving the latter at the same or different speeds; and a door in the other end of said hull for loading and unloading cargo.

28. An amphibian comprising: a hull; two hollow members, one of which is provided on each side of said hull; two track-laying belts, one of which is mounted about each of said hollow members; a pair of engines for driving said belts, each of said hollow members having one of said engines mounted therein; means for transmitting power from said engines to said belts; means forming a cargo well in said amphibian, having a floor; means at one end of said hull for controlling the operation of said amphibian; and a door in the opposite end of said amphibian, said door being hingedly connected to said hull substantially on the level of said floor.

29. An amphibian comprising: a hull; two hollow members, one of which is provided on each side of said hull; two track-laying belts, one of which is mounted about each of said hollow members; a pair of engines for driving said belts, each of said hollow members having one of said engines mounted therein; means for transmitting power from both of said engines to both of said belts; and means associated with each engine to disconnect said engine from said transmission when said engine fails, thereby permitting the other engine to assume the load of driving said belts without having to turn over the dead engine.

30. An amphibian comprising: a hull; two hollow members, one of which is provided on each side of said hull; two track-laying belts, one of which is mounted about each of said hollow members; a pair of engines for driving said belts, each of said hollow members having one of said engines mounted therein; means for transmitting power from both of said engines to both of said belts; and means associated with each engine to automatically disconnect said engine from said transmission when said engine fails, thereby permitting the other engine to assume the load of driving said belts without having to turn over the dead engine.

BENJAMIN A. SWENNES.

REFERENCES CITED

The following references are of record in the file of this patent:

UNITED STATES PATENTS

| Number | Name | Date |
|---|---|---|
| 338,508 | George et al. | Mar. 23, 1886 |
| 845,850 | Carter | Mar. 5, 1907 |
| 870,107 | Koeb | Nov. 5, 1907 |
| 881,650 | Audet | Mar. 10, 1908 |
| 1,317,841 | Ware | Oct. 7, 1919 |
| 1,459,026 | Kocher | June 19, 1923 |
| 1,781,656 | Day | Nov. 11, 1930 |
| 1,906,708 | Morgan | May 2, 1933 |
| 1,933,873 | Osman | Nov. 7, 1933 |
| 2,120,104 | Livermore | June 7, 1938 |
| 2,133,652 | Best | Oct. 18, 1938 |
| 2,138,207 | Roebling | Nov. 29, 1938 |
| 2,268,601 | Knox | Jan. 6, 1942 |
| 2,307,334 | Peek | Jan. 5, 1943 |
| 2,309,875 | Thompson | Feb. 2, 1943 |
| 2,329,733 | Watson | Sept. 21, 1943 |
| 2,330,218 | Jones | Sept. 28, 1943 |
| 2,341,866 | Higgins | Feb. 15, 1944 |
| 2,344,730 | Ramsey | Mar. 21, 1944 |